2,945,895

STABILIZATION OF CHLORINATED HYDROCARBONS WITH A SYNERGISTIC COMBINATION OF A TERTIARY ACETYLENIC MONOHYDRIC ALCOHOL AND 2,6 - DI - TERT - BUTYL - PARA - CRESOL

Robert J. Burch, Berkeley Heights, and Morton W. Leeds, Union, N. J., assignors to Air Reduction Company, Incorporated, New York, N.Y., a corporation of New York No Drawing. Filed Feb. 8, 1956, Ser. No. 564,119

7 Claims. (Cl. 260—652.5)

This invention relates to the stabilization of chlorinated hydrocarbons, more particularly, it relates to the stabilization of chlorinated hydrocarbon solvents against degradation when exposed to heat, light, and air; and it comprises a method of effecting such stabilization.

The term "stabilization," in its various forms, as used in this specification and the appended claims, is intended to refer to the inhibition of the decomposition reaction and/or the alleviation of the deleterious effects of decomposition products.

The chlorinated hydrocarbons are widely used, among other things, as solvents in degreasing metallic articles, extracting caffein from coffee, and in dry cleaning. The principal shortcomings of chlorinated hydrocarbons is their tendency to undergo degradation by oxidation, hydrolysis or pyrolysis when exposed to light, air, or elevated temperatures or upon long term storage. Upon degradation, various chloride derivatives of the solvents are formed which hydrolyze in the presence of moisture to produce hydrochloric acid and organic acids. It is believed that these acid substances are responsible for the corrosion of metals with which the chlorinated hydrocarbon solvent comes into contact. The acid substances formed are also detrimental to both fabrics and dyestuffs. While many organic chemical additives have been suggested as stabilizers for chlorinated hydrocarbons there is still a great need for improving the stability of chlorinated hydrocarbons. To be of greatest value, a stabilizer or stabilizer system should inhibit the degradation of the solvent under most conditions of application, act as a scavenger for whatever objectionable degradation products that are formed, and inhibit metal corrosion.

It is an object of the present invention to provide a chlorinated hydrocarbon solvent having improved stability. An additional object is to provide a mixture of stabilizing materials which will exert a synergistic effect one with the other so that chlorinated hydrocarbon solvents are more effectively stabilized with the mixture than with either stabilizing material alone. A further object is to provide an improved process for stabilizing chlorinated hydrocarbons. Other objects will in part appear in, and in part be obvious from, the following detailed description.

An important contribution in the field of stabilization of chlorinated hydrocarbon solvents has been the discovery that tertiary acetylenic monohydric alcohols may be used as stabilizers. The tertiary acetylenic monohydric alcohols which have been found effective may be represented by the formula:

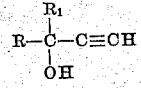

wherein R is an alkyl group containing from 1–6 carbon atoms and $R_1$ may be an alkyl, aryl, alkaryl, or cycloalkyl radical. The following compounds are representative of those encompassed by the foregoing formula:

2-methyl-3-butyn-2-ol
3-methyl-1-pentyn-3-ol
3-methyl-1-nonyn-3-ol
3,5-dimethyl-1-hexyn-3-ol
2-phenyl-3-butyn-2-ol The use of these compounds as stabilizers for chlorinated hydrocarbon solvents is more fully described and disclosed in the copending application of Warren C. Ellis, Jr. and Morton W. Leeds, Serial No. 408,978, filed on Feb. 8, 1954. Due to the wide variety of uses and conditions to which the chlorinated hydrocarbon solvents are put, it has been found desirable, in many cases, to supplement the stabilizing activity of the tertiary monohydric acetylenic alcohols with an additional material or materials.

According to the present invention, it has now been discovered that a mixture of such a tertiary acetylenic monohydric alcohol and 2,6-di-tert-butyl-para-cresol is unusually effective in stabilizing chlorinated hydrocarbons. This combination of materials exerts a stabilizing effect upon chlorinated hydrocarbons which is greater than additive with respect to the effect exerted by its components separately. Furthermore, chlorinated hydrocarbons stabilized with this combination of materials may be used for a wider variety of uses and under more extreme conditions without fear of the formation of objectionable amounts of acid products. In addition, it has been found that this combination of stabilizers unexpectedly exerts an anti-corrosive effect when the solvent is employed for the vapor phase degreasing of metallic articles. Still further, under certain conditions this combination of additives effectively acts as a scavenger for any objectionable degradation products that are formed.

We have found that this unexpected synergistic stabilizing activity may be obtained with a combination of 2,6-di-tert-butyl-para-cresol with any of the tertiary acetylenic monohydric alcohols represented by the formula:

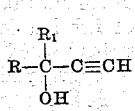

wherein R and $R_1$ have the same meaning as given above. Combinations of 2,6-di-tert-butyl-para-cresol with 2-methyl-3-butyn-2-ol or 3-methyl-1-pentyn-3-ol have been found to be particularly effective in stabilizing chlorohydrocarbons.

While the amount of stabilizer mixture added to the chlorohydrocarbon solvent will depend upon the particular solvent to be stabilized, the intended use of the solvent composition, and the degree of stability desired, generally, the total amount of the two ingredients added to the chlorinated solvent may range from as low as about 0.1 percent by weight to about 1.0 percent by weight. Any suitable proportion of tertiary acetylenic monohydric alcohol to 2,6-di-tert-butyl-para-cresol may be used, however, it has been found that only a slight amount of 2,6-di-tert-butyl-para-cresol need be employed to obtain the desired effects. For example, the ratio of said acetylenic alcohol to said cresol may vary from about 30:1 to 1:1.

When operating in accordance with this invention, the two stabilizing materials may simply be mixed together to form a composition adapted to be subsequently added to, or admixed with, the chlorinated hydrocarbon solvent to be stabilized, or each of the stabilizer materials may be individually added to, or admixed with, the chlorohydrocarbon solvent. For certain applications of the chlorinated hydrocarbon solvents it may be desirable to add other stabilizing agents, such as alkaline reacting materials and unsaturated materials, e.g. diisobutylene.

While the combination of a tertiary acetylenic monohydric alcohol and 2,6-di-tert-butyl-para-cresol has been found to be especially suitable for the stabilization of trichloroethylene and perchloroethylene, the mixture may also be used to stabilize other chlorohydrocarbons such as methylene chloride, methyl chloroform, ethylene dichloride, trichloroethane, vinylidine chloride, vinyl chloride, and the like.

The following table will illustrate the unexpected synergistic stabilizing effects obtainable by employing a combination of a tertiary acetylenic monohydric alcohol and 2,6-di-tert-butyl-para-cresol. In each case, the stabilizer system was added, in the amounts indicated, to 150 ml. of trichloroethylene containing 7.5 ml. of water and 4 grams each of finely divided aluminum (8–20 mesh), iron (40 mesh), zinc (40 mesh), and fine copper turnings. The water and finely divided metals were added to accelerate solvent decomposition. The trichloroethylene employed had previously been purified by passing it through a column packed with alumina. Cleaned metal specimens, measuring 2" x ½" x 1/16", of each of iron, copper, zinc, and aluminum were suspended at three different locations: (1) half in and half out of the liquid, (2) in the boiling vapors, and (3) halfway immersed in the condensate. After refluxing the solvent mixture for 144 hours, the metal specimens were removed. Those specimens which were in the liquid phase were rinsed into the flask. The metal specimens were visually examined for corrosion, and rated for corrosion on an arbitrary scale from 1 to 10, the numeral 1 indicating minimum corrosion and 10 indicating maximum corrosion. The trichloroethylene solvent mixture was filtered. Approximately 50 ml. of 0.1 N sodium hydroxide solution and water were added to the filtrate to make the final volume 500 ml. The final mixture was shaken and permitted to settle into an aqueous and an organic layer. Samples of the water layer were analyzed for total acidity by back titration of the base, and for chloride ion by electrometric titration. The figure, $\Delta Cl^- \times 10^3$ moles, appearing in the table, represents the amount of $Cl^-$ ion formed during the test, or the difference in concentration between that $Cl^-$ ion present at the start of the test and that which was present after the test was completed. Similarly, $\Delta H^+ \times 10^3$ moles is the amount of $H^+$ ion formed during the test. The various tests were performed in duplicate and the results recorded in the following table are an average of these duplicate runs. Percents given are percent by weight.

It will be noted that when the combination of a tertiary acetylenic monohydric alcohol and 2,6-di-tert-butyl-para-cresol is employed as the stabilizer system not only is the Table

| Stabilizer System | Total Corrosion Rating For All Metals | $\Delta Cl^- \times 10^3$ Moles | $\Delta H^+ \times 10^3$ Moles |
|---|---|---|---|
| 0.2% 3-methyl-1-pentyn-3-ol | 5.5 | 0.75 | 0.66 |
| 0.009% 2,6-ditert-butyl-para-cresol | 5.3 | 0.63 | 0.63 |
| 0.2% 3-methyl-1-pentyn-3-ol 0.009% 2,6-ditert-butyl-para-cresol | 3.5 | 0.31 | 0.21 | amount of $Cl^-$ and $H^+$ ions formed markedly reduced, but also the degree of metal corrosion is significantly decreased, all of this demonstrating the superior ability of the mixture to control the formation of objectionable acid substances.

Since many different embodiments of this invention may be made without departing from the spirit and scope thereof, it is to be understood that the invention should not be limited except as defined in the appended claims.

What is claimed is:

1. A composition of matter comprising a chlorinated hydrocarbon solvent and a small but stabilizing amount of 2,6-di-tert-butyl-para-cresol and 3-methyl-1-pentyn-3-ol.

2. A composition according to claim 1 wherein said chlorinated hydrocarbon solvent is trichloroethylene.

3. A composition according to claim 1 wherein said chlorinated hydrocarbon solvent is perchloroethylene.

4. A composition of matter comprising a chlorinated hydrocarbon solvent and between about 0.1 to 1.0 percent by weight of 2,6-di-tert-butyl-para-cresol and 3-methyl-1-pentyn-3-ol.

5. A process for stabilizing a chlorinated hydrocarbon solvent which comprises incorporating a small but stabilizing amount of 2,6-di-tert-butyl-para-cresol and 3-methyl-1-pentyn-3-ol into said chlorinated hydrocarbon solvent.

6. A process according to claim 5 wherein said chlorinated hydrocarbon solvent is trichloroethylene.

7. A process according to claim 5 wherein said chlorinated hydrocarbon solvent is perchloroethylene.

References Cited in the file of this patent

UNITED STATES PATENTS

| 2,008,680 | Carlisle et al. | July 23, 1935 |
| 2,155,723 | Levine et al. | Apr. 25, 1939 |
| 2,603,622 | Berger et al. | July 15, 1952 |
| 2,775,624 | Skeeters et al. | Dec. 25, 1956 |

FOREIGN PATENTS

| 702,848 | Great Britain | Jan. 27, 1954 |